United States Patent
Svore et al.

(10) Patent No.: US 9,275,011 B2
(45) Date of Patent: Mar. 1, 2016

(54) FAST QUANTUM AND CLASSICAL PHASE ESTIMATION

(71) Applicant: Microsoft Corporation, Redmond, WA (US)

(72) Inventors: Krysta M. Svore, Seattle, WA (US); Matthew B. Hastings, Santa Barbara, CA (US); Michael H. Freedman, Santa Barbara, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 303 days.

(21) Appl. No.: 13/917,497

(22) Filed: Jun. 13, 2013

(65) Prior Publication Data

US 2014/0297708 A1    Oct. 2, 2014

Related U.S. Application Data

(60) Provisional application No. 61/805,891, filed on Mar. 27, 2013.

(51) Int. Cl.
   *G06F 17/10*   (2006.01)
   *G06N 99/00*   (2010.01)
   *B82Y 10/00*   (2011.01)

(52) U.S. Cl.
   CPC ............. *G06F 17/10* (2013.01); *B82Y 10/00* (2013.01); *G06N 99/002* (2013.01)

(58) Field of Classification Search
   None
   See application file for complete search history.

(56) References Cited

U.S. PATENT DOCUMENTS

| 8,543,627 | B1* | 9/2013 | Tucci ........................... 708/274 |
| 2004/0078421 | A1* | 4/2004 | Routt ........................... 709/201 |
| 2005/0133780 | A1* | 6/2005 | Azuma ........................... 257/13 |
| 2006/0224547 | A1* | 10/2006 | Ulyanov et al. ............... 706/62 |
| 2007/0250280 | A1 | 10/2007 | Beausoleil et al. |
| 2012/0269247 | A1 | 10/2012 | Li et al. |
| 2014/0207723 | A1* | 7/2014 | Alboszta et al. ............... 706/46 |
| 2014/0280427 | A1* | 9/2014 | Bocharov et al. ............. 708/523 |
| 2014/0297708 | A1* | 10/2014 | Svore et al. ................... 708/517 |

OTHER PUBLICATIONS

Travaglione et al., "Generation of Eigenstates Using the Phase-Estimation Algorithm," Journal of Physical Review A, 63(3), 5 pp. (Feb. 5, 2001).

Mosca et al., "The Hidden Subgroup Problem and Eigenvalue Estimation on a Quantum Computer," Proceedings of the 1st NASA International Conference on Quantum Computing and Quantum Communication, 16 pp. (May 1998).

Dobsicek et al., "Arbitrary Accuracy Iterative Phase Estimation Algorithm as a Two Qubit Benchmark," Journal of Physical Review A, 76(3), 4 pp. (Jul. 12, 2007).

(Continued)

*Primary Examiner* — David H Malzahn
(74) *Attorney, Agent, or Firm* — Steve Wight; Sandy Swain; Micky Minhas

(57) ABSTRACT

A quantum phase estimator may include at least one phase gate, at least one controlled unitary gate, and at least one measurement device. The quantum phase estimator receives at least one ancillary qubit and a calculational state comprised of multiple qubits. The phase gate may apply random phases to the ancillary qubit, which is used as a control to the controlled unitary gate. The controlled unitary gate applies a second random phase to the calculational state. The measurement device may measure a state of the ancillary qubit from which a phase of the calculational state may be determined.

18 Claims, 5 Drawing Sheets

(56) References Cited

OTHER PUBLICATIONS

Dam et al., "Optimal Quantum Circuits for General Phase Estimation," Journal of Physical Review Letters, 98(9), 4 pp. (Mar. 1, 2007).
Shende et al., "Synthesis of Quantum-Logic Circuits," IEEE Transactions on Computer-Aided Design of Integrated Circuits and Systems, 25(6), 11 pp. (Jun. 2006).
Lanyon et al., "Towards Quantum Chemistry on a Quantum Computer," Journal of Nature Chemistry, 2, 20 pp. (May 8, 2009).
Shor, "Polynomial-Time Algorithms for Prime Factorization and Discrete Logarithms on a Quantum Computer," SIAM Journal on Computing, 26(5), 26 pp. (Oct. 1997).
Ozols et al., "Quantum Rejection Sampling," Proceedings of the 3rd Innovations in Theoretical Computer Science Conference, 19 pp. (Jan. 8, 2012).
Selinger, "Efficient Clifford+T Approximation of Single-Qubit Operators," Journal of Quantum Physics, 16 pp. (Dec. 26, 2012).
Cleve et al., "Fast Parallel Circuits for the Quantum Fourier Transform," Proceedings of 41st Annual Symposium on Foundations of Computer Science, 11 pp. (Nov. 12, 2000).
Pham et al., "A 2D Nearest-Neighbor Quantum Architecture for Factoring," Proceedings of Reversible Computing, 15 pp. (Jul. 2012).
Gossett "Quantum Carry-Save Arithmetic," Journal of Quantum Physics, 12 pp. (Aug. 29, 1998).
International Search Report and Written Opinion from International Application No. PCT/US2014/031910, dated Mar. 3, 2015, 13 pages.
Garcia-Mata et al., "Quantum Phase Estimation Algorithm in Presence of Static Imperfections," Eur. Phys. J. D, 47:151-156 (Apr. 2008).
Varga et al., "Phase Estimation Procedure to Solve Quantum-Mechanical Eigenvalue Problems," Physical Review A, 78:022337-1-5 (Aug. 2008).
Wocjan et al., "Quantum Algorithm for Approximating Partition Functions," Physical Review A, 80: 022340-1-8 (Aug. 2009).
Written Opinion of the International Preliminary Examining Authority from International Application No. PCT/US2014/031910, dated Aug. 20, 2015, 9 pages.
International Preliminary Report on Patentability from International Application No. PCT/US2014/031910, dated Nov. 24, 2015, 10 pages.

\* cited by examiner

FAST QUANTUM AND CLASSICAL PHASE ESTIMATION

CROSS REFERENCE TO RELATED PATENT APPLICATIONS

This patent application claims priority from U.S. Provisional Application No. 61/805,891, filed on Mar. 27, 2013, which provisional application is incorporated herein its entirety by reference.

BACKGROUND

Quantum algorithms promise computational speed-ups over their classical counterparts. Quantum phase estimation is a technique used in quantum algorithms, including algorithms for quantum chemistry (see, A. Aspuru-Guzik, A. D. Dutoi, P. J. Love, and M. Head-Gordon, Science 309, 1704 (2005), and B. P. Lanyon, J. D. Whitfield, G. G. Gillet, M. E. Goggin, M. P. Almeida, I. Kassal, J. D. Biamonte, M. Mohseni, B. J. Powell, M. Barbieri, A. Aspuru-Guzik, and A. G. White, Nature Chemistry 2, 106, 2008, arXiv:0905.0887), and quantum field theory (see, S. P. Jordan, K. S. M. Lee, and J. Preskill, "Quantum computation of scattering in scalar quantum field theories," (2011), arXiv: 1112.4833), Shor's algorithm for prime factorization (see, P. Shor, SIAM Journal of Computing 26, 1484 (1997)), and algorithms for quantum sampling (see, M. Ozols, M. Roetteler, and J. Roland, in 3rd Innovations in Theoretical Computer Science Conference (ITCS), (ACM, 2012) pp. 290{308, arXiv:1103.2774, and also K. Temme, T. Osborne, K. Vollbrecht, D. Poulin, and F. Verstraete, Nature 471 (2011), 10.1038/nature09770, arXiv: 0911.3635). Quantum phase estimation can also be used to find eigenvalues of a unitary matrix efficiently.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

DETAILED DESCRIPTION

Overview

This disclosure describes techniques for performing quantum phase estimation based on basic measurements and classical post-processing. The techniques may use purely random measurements that involve a number of measurements that may be optimal up to constant factors, albeit at the cost of exponential classical post-processing. The technique can also be used to improve classical signal processing. A quantum technique for phase estimation that yields an asymptotic improvement in runtime is discussed, and in some instances, the quantum technique comes within a factor of log* of the minimum number of measurements required while still utilizing minimal classical post-processing. The corresponding quantum circuit provides asymptotically lower depth and width (number of qubits) than previous quantum phase estimation circuits.

This disclosure includes the following sections: Section A describes an example environment for performing quantum phase estimation; and Section B describes an example framework for quantum phase estimation based on basic measurements and classical post-processing.

The process and systems described herein may be implemented in a number of ways. Example implementations are provided below with reference to the following figures.

A: Illustrative Environment

Figure 1:
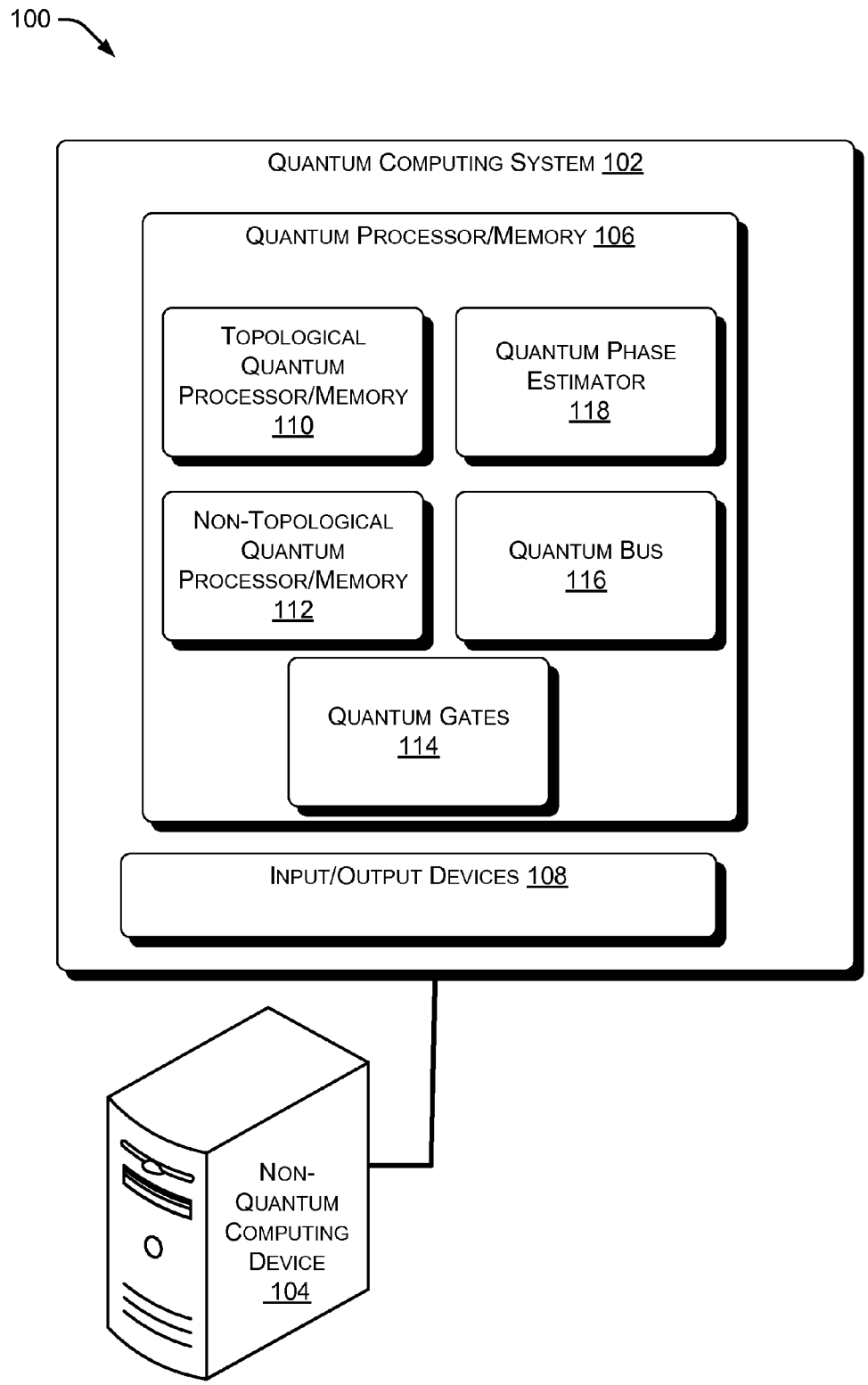
FIG. 1 is a schematic diagram of an illustrative environment usable for estimating phases.

FIG. 1 is a schematic diagram of an example environment 100 for performing quantum phase estimation. The environment 100 includes a quantum computing system 102 and a non-quantum computing device 104. The non-quantum computing device 104 may be a digital computing system.

The quantum computing system 102 may include a quantum processor/memory 106 and input/output devices 108. The input/output devices 108 may include interferometers and other devices for, among other things, reading and setting states of qubits in the quantum processor/memory 106 and may include devices for interfacing with the non-quantum computing device 104.

The quantum processor/memory 106 may include topological quantum processor/memory 110, non-topological quantum processor/memory 112, quantum gates 114, quantum bus 116, and quantum phase estimator 118. The topological quantum processor/memory 110 may include devices and components for providing topological based quantum computing, e.g., 5/2/quantum Hall systems and systems exhibiting Majorana modes such as, but not limited to, 1-dimensional or quasi 1-dimensional wires. See U.S. patent application Ser. No. 13/860,246, filed Apr. 10, 2013, entitled "Multi-Band Topological Nanowires," which is incorporated by reference herein in its entirety, for details of an exemplary system exhibiting Majorana modes.

The non-topological quantum processor/memory 112 may include devices and components for providing non-topological based quantum computing. For example, the non-topological quantum processor/memory 112 may include Josephson junctions for providing flux qubits.

The quantum bus 116 may include devices and components for providing an interface between quantum processor/memory 106 and the input/output devices 108. The quantum bus 116 may include devices and components for providing an interface between the topological quantum processor/memory 110 and the non-topological quantum processor/memory 112. An example quantum bus is described in U.S. patent application Ser. No. 13/292,217, U.S. Patent Publication No. 20120112168, entitled "Coherent Quantum Information Transfer between Topological and Conventional Qubit," filed Nov. 9, 2011, which is incorporated by reference herein in its entirety.

The quantum gates 114 may include various devices and components for performing various operations on qubit states. For example, quantum gates 114 may include devices and components for, among others, Hadamard gates, phase gates, controlled gates (e.g., controlled unitary gates), adder gates, and corresponding adjoint adder gates. The Hadamard gate acts on a single qubit and maps the basis state $|0\rangle$ to $(|0\rangle+|1\rangle)/\sqrt{2}$ and the basis state $|1\rangle$ to $(|0\rangle-|1\rangle)/\sqrt{2}$ and represents a rotation of π about the x- and z-axes. A phase gate acts on a single qubit and may alter the phase of one basis state of the qubit while leaving the other basis state unchanged. A controlled gate may act on multiple qubits, where one or more of the qubits provide a control for an operation. An adder gate such as, but not limited to, a 3-2 quantum adder (also called a carry save adder), may add multiple qubits, and a corresponding adjoint adder gate may undo operations of an adder gate.

The quantum phase estimator 118 includes devices and components for estimating quantum phases.

Illustrative Quantum Phase Estimators

Figure 2:
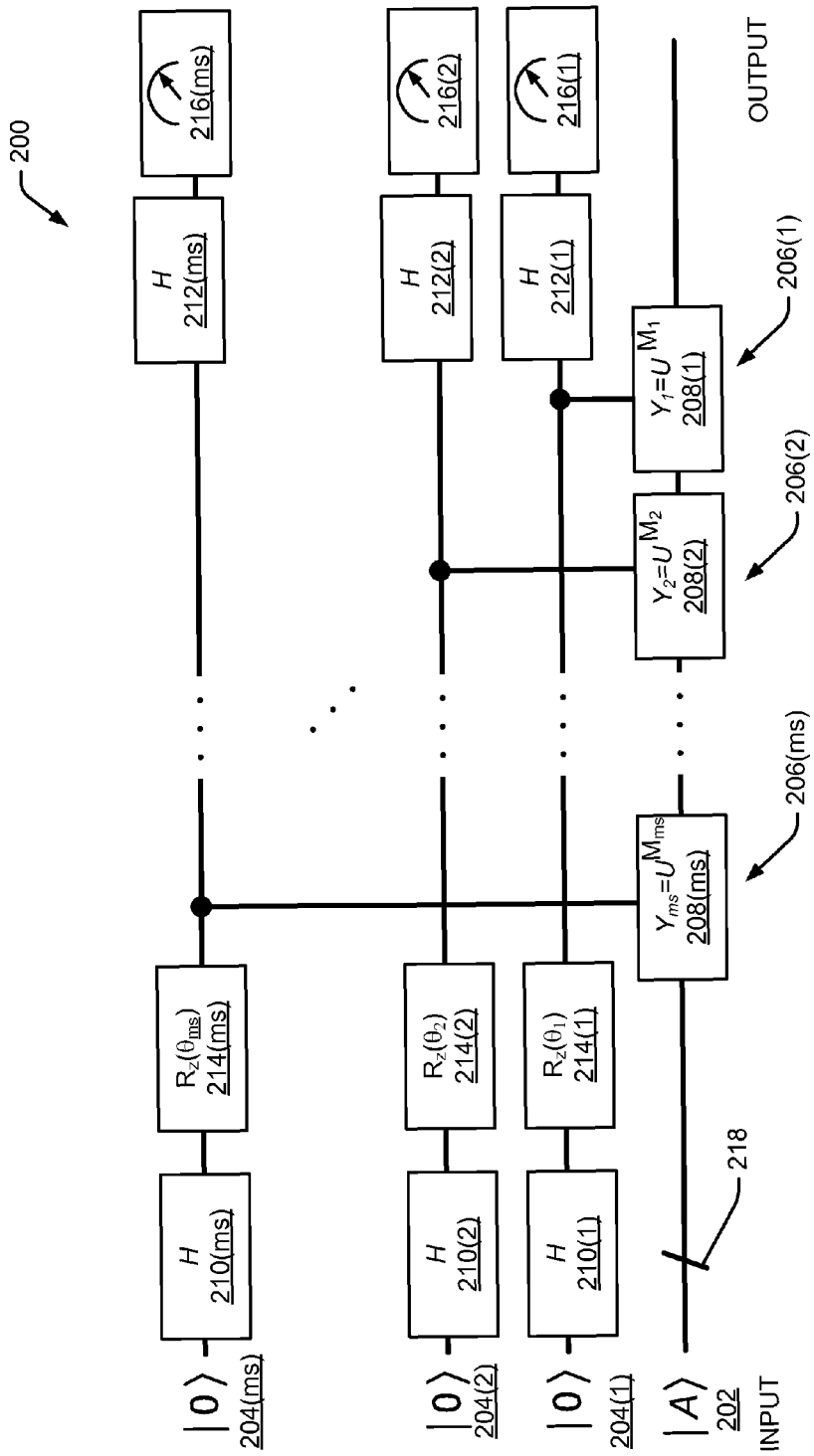
FIG. 2 is a schematic diagram of an illustrative circuit for estimating quantum phases.
Figure 3:
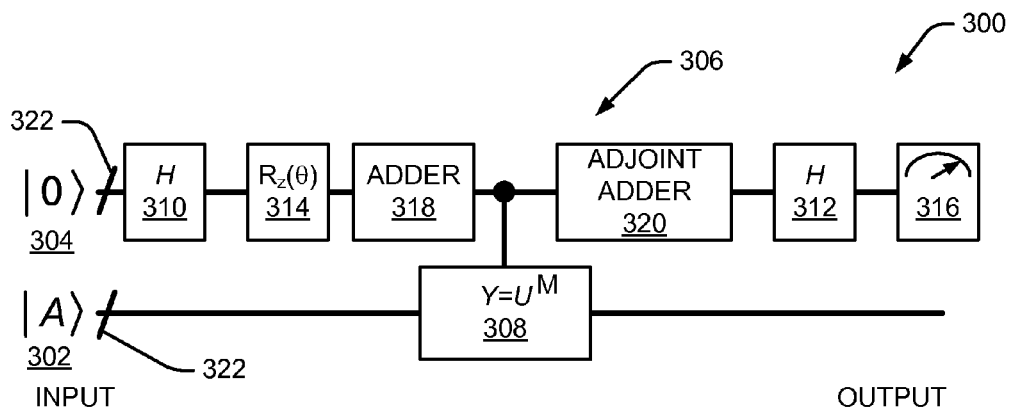
FIG. 3 is a schematic diagram of another illustrative circuit for estimating quantum phases.
Figure 4:
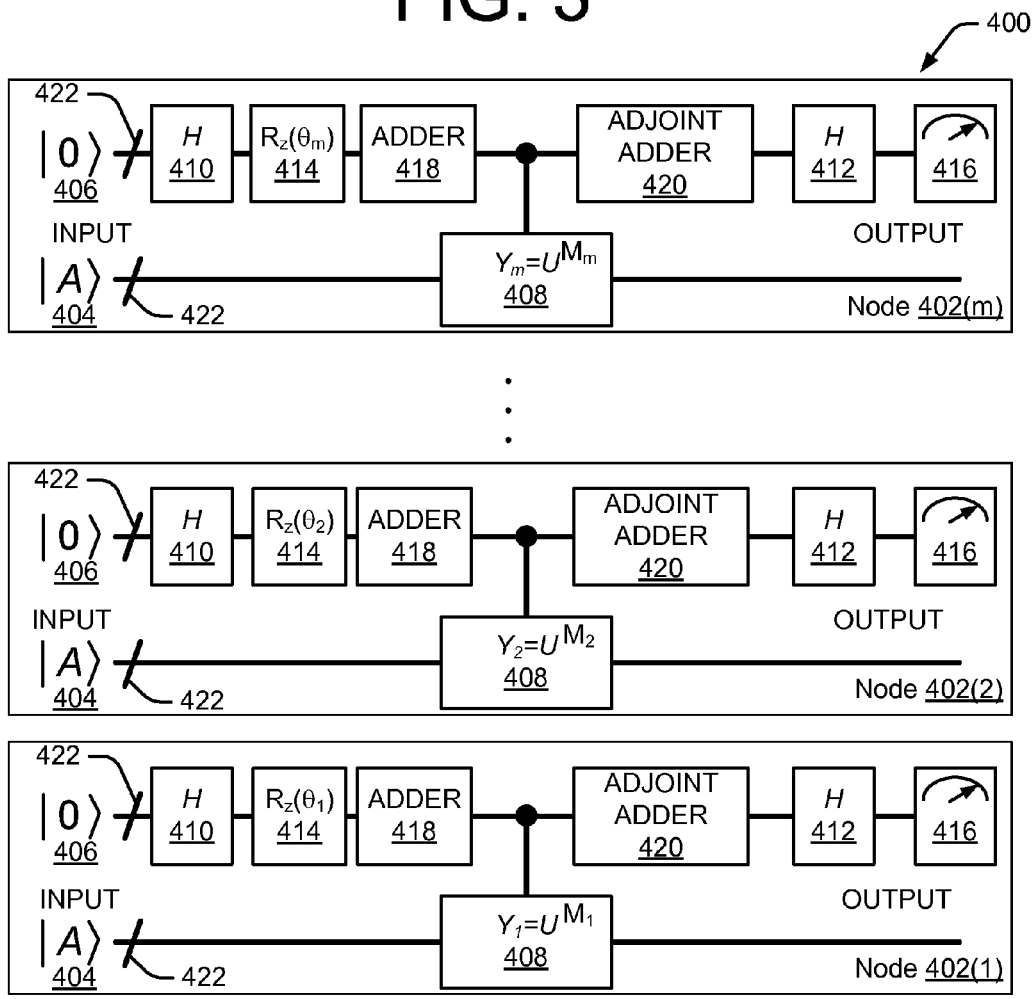
FIG. 4 is a schematic diagram of another illustrative circuit for estimating quantum phases.

FIGS. 2-4 show non-limiting embodiments of example quantum phase estimators. The operation of the various quantum phase estimators are discussed hereinbelow in subsequent sections of this disclosure.

FIG. 2 is a schematic diagram of an example sequential quantum phase estimator 200 that may be employed by the quantum processor/memory 106 of FIG. 1. The sequential quantum phase estimation circuit 200 receives a calculational state ($|A\rangle$) 202, ancillary qubits ($|0\rangle$), individually referenced as 204(1)-204(ms) and collectively referenced as 204, and includes a plurality of measurement circuits, individually referenced as 206(1)-206(ms) and collectively referenced as 206. Each measurement circuit 206 may be comprised of a controlled unitary gate 208, a pair of Hadamard gates 210 and 212, a phase gate 214, and a measurement device 216. A "slash" 218 indicates that the calculational state ($|A\rangle$) 202 is comprised of multiple qubits. The calculational state ($|A\rangle$) 202 may be, among other things, a quantum state employed in decryption (e.g., for prime factorization), quantum chemistry, sorting, and/or noisy signal analysis.

Features having the same indices, which are enclosed by parenthesis and appended to reference numerals, are part of the same measurement circuit 206. For example, the measurement circuit 206(1) includes the controlled unitary gate 208(1), the Hadamard gates 210(1) and 212(1), the phase gate 214(1), and the measurement device 216(1).

Each one of the controlled unitary gates 208(1)-208(ms) has a corresponding applied unitary operator $Y_1$ through $Y_{ms}$. The calculational state ($|A\rangle$) 202 is an eigenvector of each of the applied unitary operators $Y_1$-$Y_{ms}$ (i.e., $Y_j|A\rangle=\lambda_j|A\rangle$, j=1, 2, ... ms), and $\lambda_j=e^{2\pi i\Phi_j}$ due to $Y_j$ being unitary) and is an eigenvector of a base unitary operator U (i.e., $U|A\rangle=\lambda|A\rangle=e^{2\pi i\Phi}|A\rangle$). Each of the applied unitary operators $Y_1$-$Y_{ms}$ is equivalent to corresponding multiple applications of the base unitary operator U (i.e., $Y_j=U^{M_j}$, where $M_j$ is an integer), and consequently, the eigenvalues are given by $\lambda_j=e^{2\pi i\Phi_j}=e^{2\pi iM_j\Phi}$.

In some embodiments, the controlled unitary gates 208 may be programmable such that the applied unitary operators Y may be changeable. For example, the applied unitary operators Y may be changed for different rounds of measurements, e.g., consider the controlled unitary gate 208(j), in an $n^{th}$ round of measurements $Y_j^n=U^{M_j^n}$ and in an (n+1) round of measurements $Y_j^{n+1}=U^{M_j^{n+1}}$, where multiples $M_j^n$ and $M_j^{n+1}$ may be different.

In some instances, multiples (i.e., $M_j^n$) may correspond to random values, or a sum of random values, or may correspond to non-random values. For example, in one round of measurements, e.g., in a first round of measurements, multiples $M_j^1$ for j=1, 2, ..., ms may be assigned in a predetermined, non-random, manner, and in a second round of measurements, multiples $M_j^2$ for j=1, 2, ..., ms may correspond to random values or a sum of random values.

The sequential quantum phase estimation circuit 200 performs operations from left to right. Thus, the measurement circuits 206 are arranged to perform sequential measurements of the calculational state ($|A\rangle$) 202 starting with the measurement circuit 206(ms) and ending with the measurement circuit 206(1).

Operations of the measurement circuit 206(ms) are discussed in detail. The operations of the remaining measurement circuits 206(1)-206(ms−1) are identical, or essentially identical, and a detailed discussion of such is omitted in the interest of brevity.

The Hadamard gate 210(ms) operates on the ancillary qubit 204(ms), thereby changing the state of the ancillary qubit 204(ms) from state $|0\rangle$ to superposition of states $|0\rangle$ and $|1\rangle$, having equal amplitude (i.e., $|0\rangle \rightarrow (|0\rangle+|1\rangle)/\sqrt{2}$. The phase gate 214(ms) operates on the ancillary qubit 204(ms) $((|0\rangle+|1\rangle)/\sqrt{2})$ and provides a phase factor ($e^{2\pi i\theta_{ms}}$) to one of the basis states while leaving the other basis state unchanged, e.g., $((|0\rangle+e^{2\pi i\theta_{ms}}|1\rangle)/\sqrt{2}))$. The ancillary qubit 204(ms)+ $((|0\rangle+e^{2\pi i\theta_{ms}}|1\rangle)/\sqrt{2}))$ is a control to the controlled unitary gate 208(ms).

When the ancillary qubit 204(ms) is in the state $|0\rangle$, the applied unitary operator ($Y_{ms}$) is not applied to the calculational state ($|A\rangle$) 202. Thus, the calculational state ($|A\rangle$) 202 is unchanged and is provided to the subsequent controlled unitary gate 208(ms−1) (not shown).

However, when the ancillary qubit 204(ms) is in the state $|1\rangle$, the applied unitary operator ($Y_{ms}$) is applied to the calculational state ($|A\rangle$) 202. The calculational state ($|A\rangle$) 202 picks up a phase factor $e^{2\pi iM_{ms}\Phi}$ and is provided to the subsequent controlled unitary gate 208(ms−1) (not shown). The ancillary qubit 204(ms) also picks up the phase factor $e^{2\pi iM_{ms}\Phi}$.

The Hadamard gate 212(ms) operates on the ancillary qubit 204(ms) to undo the operations of the first Hadamard gate 210(ms). The measurement device 216 measures the current state (i.e., $|0\rangle$ or $|1\rangle$) of the ancillary qubit 204(ms). The probability of the measurement device 216 measuring the ancillary qubit 204(ms) being in the zero base state ($|0\rangle$) is different from the probability of the measurement device 216 measuring the ancillary qubit 204(ms) being in the one base state ($|1\rangle$). The probabilities are a function of $\theta_{ms}$, $M_{ms}$ and $\phi$.

The measurement results from the measurement devices 216(1)-216(ms) may be provided to the non-quantum computing device 104, which may apply various statistical algorithms/techniques to determine the phase $\phi$.

In some embodiments, the quantity "ms" may be approximately equal to the product of "m" times "s," where "m" represents the number of bits for which the phase $\phi$ is to be determined and "s" represents a sample size of measurements.

In some embodiments, the phases ($\theta_j$, for j=1, 2 ... ms) by the phase gates 214(1)-214(ms) and the multiples ($M_j$, for j=1, 2 ... ms) by the controlled unitary gates 208(1)-208(ms) may be selected randomly.

FIG. 3 is a schematic diagram of an example parallel quantum phase estimator 300 that may be employed by the quantum processor/memory 106 of FIG. 1. The parallel quantum phase estimator 300 receives a calculational state ($|A\rangle$) 302 and ancillary qubits ($|0\rangle$) 304 and includes a measurement circuit 306. The measurement circuit 306 may be comprised of a controlled unitary gate 308, a pair of Hadamard gates 310 and 312, a phase gate 314, and a measurement device 316. The measurement circuit 306 may further include an adder gate 318 and adjoint adder gate 320. The "slashes" 322 indicates that the calculational state ($|A\rangle$) 302 and the ancillary qubits 304 are comprised of multiple qubits.

The parallel phase estimation circuit 300 performs operations from left to right.

The Hadamard gate 310 operates on the ancillary qubits 304, thereby changing the state of the ancillary qubits 304 from state $|0\rangle$ to superposition of states $|0\rangle$ and $|1\rangle$, having equal amplitude (i.e., $|0\rangle \rightarrow (|0\rangle+|1\rangle)/\sqrt{2}$). The phase gate 314 operates on the ancillary qubit 304 $((|0\rangle+|1\rangle)/\sqrt{2})$ and provides a phase factor $(e^{2\pi i \theta_{ms}})$ to one of the basis states while leaving the other basis state unchanged, e.g., $((|0\rangle+e^{2\pi i \theta_{ms}}|1\rangle)/\sqrt{2})$.

After the Hadamard gate 310 and the phase gate 314, the adder gate 318 computes a state $|S\rangle$, which is a sum of the ancillary qubit 304. The state $|S\rangle$ is a control to the controlled unitary gate 308.

The controlled unitary gate 308 may operate on the calculational state $(|A\rangle)$ 302 with the applied unitary operator $Y=U^M$. The state $|S\rangle$ may pick up a phase factor $(e^{2\pi i M \phi})$ through the application of the applied unitary operator Y.

The adjoint adder gate 320 operates to uncompute the state $|S\rangle$ (i.e., to reverse the operation of the adder gate 318).

The Hadamard gate 312 operates on the ancillary qubits 304 to undo, or reverse, the operations of the first Hadamard gate 310. The measurement device 316 measures the current states (i.e., $|0\rangle$ or $|1\rangle$) of the ancillary qubits 304. In some embodiments, the measurement device 316 measures the current states (i.e., $|0\rangle$ or $|1\rangle$) of the ancillary qubits 304 concurrently or approximately simultaneously.

The measurement results from the measurement device 316 may be provided to the non-quantum computing device 104, which may apply various statistical algorithms/techniques to determine the phase $\phi$.

In some embodiments, the ancillary qubits 304 may be comprised of "s" qubits, where "s" represents a sample size of measurements. In such embodiments, there may be "m" iterations of measuring samples—the ancillary qubits 304 may be provided "m" times and each time the measuring device 316 may measure "s" states, and the phase (θ) employed by the phase gate 314 and the multiple "M" employed by the controlled unitary gate 308 may be programmable. In some instances, values for the phase (θ) employed by the phase gate 314 and the multiple "M" employed by the controlled unitary gate 308 may be selected in accordance with a non-random scheme, and in other instances, the values may be selected randomly. From the "m" iterations, the phase of the calculational state may be determined.

FIG. 4 is a schematic diagram of an example cluster 400 of parallel quantum phase estimators that may be employed in a cluster of quantum computing systems 102 of FIG. 1. The cluster 400 of parallel quantum phase estimators may be comprised of nodes 402(1)-402(m). Each node 402 receives a calculational state $(|A\rangle)$ 404, ancillary qubits $(|0\rangle)$ 406 and includes a measurement circuit comprised of a controlled unitary gate 408, a pair of Hadamard gates 410 and 412, a phase gate 414, a measurement device 416, an adder gate 418 and adjoint add gate 420. The "slashes" 422 indicates that the calculational state $(|A\rangle)$ 404 and the ancillary qubits 406 are comprised of multiple qubits.

In some embodiments, the ancillary qubits 406 may be comprised of "s" qubits, where "s" represents a sample size. In some embodiments, the number of nodes (m) may correspond to the number of bits for which the phase $\phi$ is to be determined.

Each node 402 of the cluster 400 of parallel quantum phase estimators operates in the same, or essentially the same, manner as the parallel quantum phase estimator 300, and in the interest of brevity, a detailed discussion of the operation of the nodes is omitted.

In some instances, for each node 402(j), the phase $(\theta_j)$ employed by the phase gate 414 and the multiple $(M_j)$ employed by the controlled unitary gate 408 may be selected randomly, and in other instances, the values for the phase $(\theta_j)$ and the multiple $(M_j)$ may be selected non-randomly.

Figure 5:
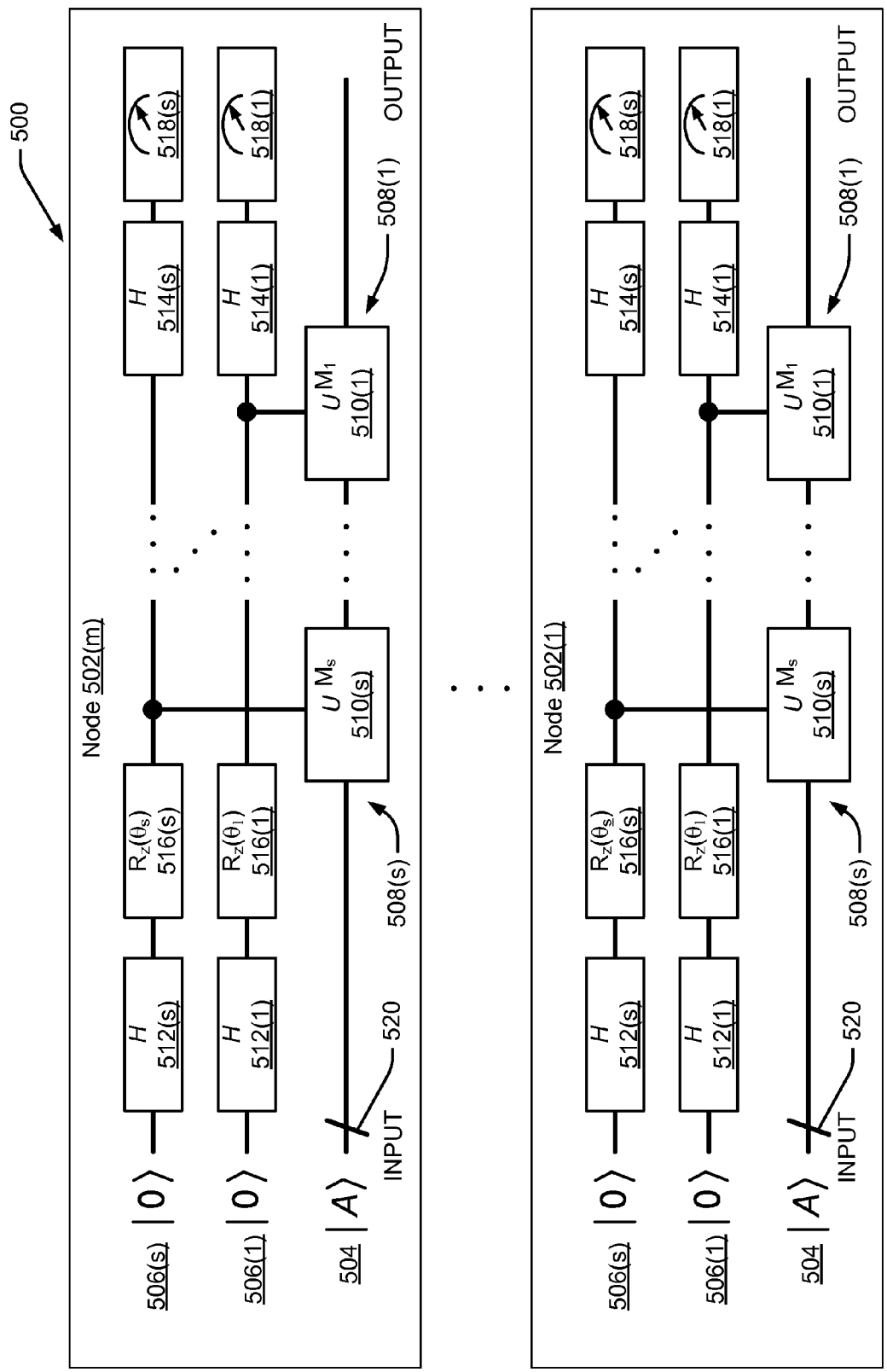
FIG. 5 is a schematic diagram of yet another illustrative circuit for estimating quantum phases.

FIG. 5 is a schematic diagram of an example cluster 500 of sequential quantum phase estimators that may be employed in a cluster of quantum computing systems 102 of FIG. 1. The cluster 500 of sequential quantum phase estimators may be comprised of nodes 502(1)-502(m). Each node 502 receives a calculational state $(|A\rangle)$ 504, ancillary qubits $(|0\rangle)$, individually referenced as 506(1)-506(s) and collectively referenced as 506, and includes a plurality of measurement circuits, individually referenced as 508(1)-508(s) and collectively referenced as 508. Each measurement circuit 508 is comprised of a controlled unitary gate 510, a pair of Hadamard gates 512 and 514, a phase gate 516, and a measurement device 518. A "slash" 520 indicates that the calculational state $(|A\rangle)$ 504 is comprised of multiple qubits.

In some embodiments, "s" (the number of ancillary number of qubits 406 received at a node 502, may represents a sample size. In some embodiments, the number of nodes (m) may correspond to the number of bits for which the phase $\phi$ is to be determined.

Each node 502 of the cluster 500 of sequential quantum phase estimators operates in the same, or essentially the same, manner as the sequential quantum phase estimator 200, and in the interest of brevity, a detailed discussion of the operation of the nodes is omitted.

In some instances, for each node 502, the phases $(\theta_j, j=1, 2 \ldots, s)$ employed by the phase gates 516 and the multiples $(M_j, j=1, 2 \ldots a)$ employed by the controlled unitary gates 508 may be selected randomly, and in other instances, the phases $(\theta_j, j=1, 2 \ldots s)$ and the multiples $(M_j, j=1, 2 \ldots s)$ may be selected non-randomly.

Illustrative Non-Quantum Computing Device

Figure 6:
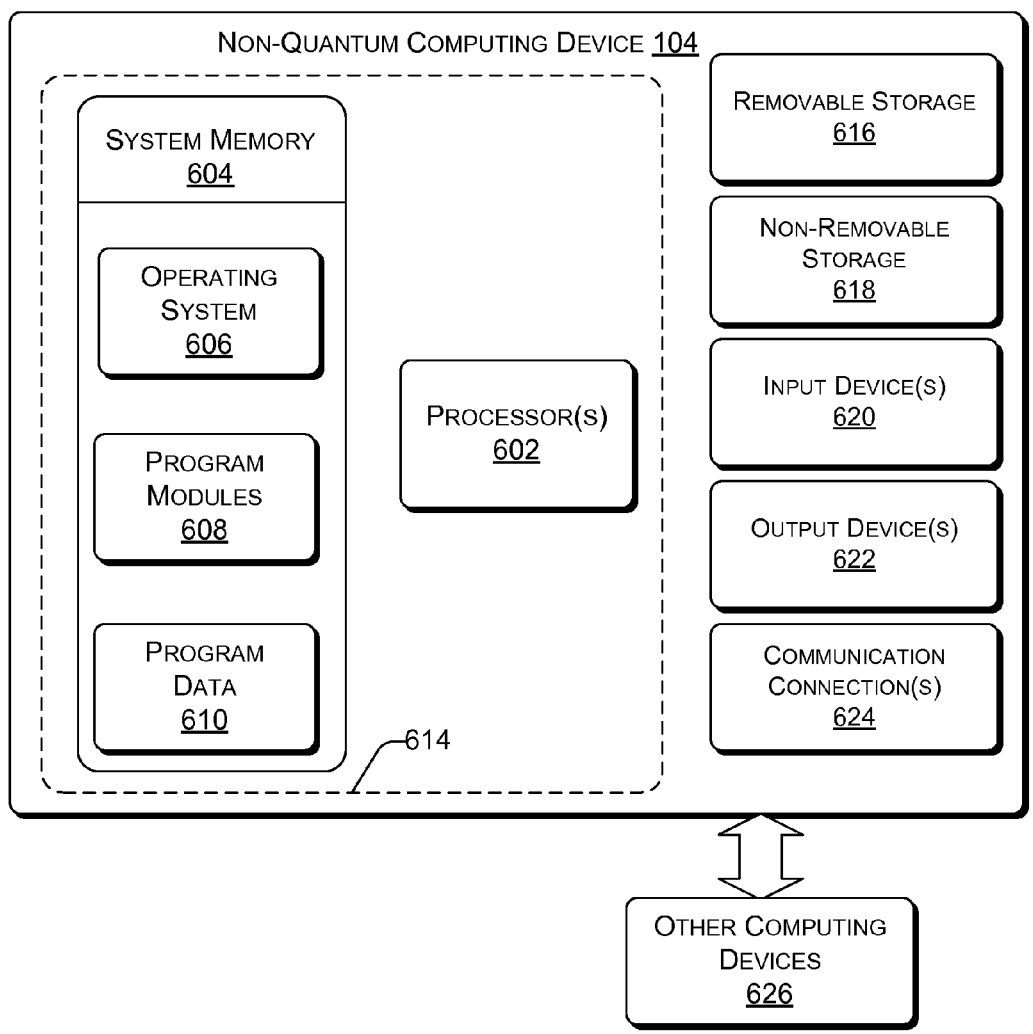
FIG. 6 is a schematic diagram of an illustrative non-quantum computing device for estimating phases and/or for classical post-processing of quantum phase estimations.

FIG. 6 shows an illustrative non-quantum computing device 104 that may be used in environment 100. It will readily be appreciated that the various embodiments described above may be implemented in other computing devices, systems, and environments. The non-quantum computing device 104 shown in FIG. 6 is only one example of a computing device and is not intended to suggest any limitation as to the scope of use or functionality of the computer and network architectures. The non-quantum computing device 104 is not intended to be interpreted as having any dependency or requirement relating to any one or combination of components illustrated in the example computing device.

In a very basic configuration, the non-quantum computing device 104 typically includes at least one processor 602 and system memory 604. The processor 602 is a non-quantum processing unit such as, for example, a conventional computer processor such as a digital processor. Depending on the exact configuration and type of computing device, the system memory 604 may be volatile (such as RAM), non-volatile (such as ROM, flash memory, etc.) or some combination of the two. The system memory 604 typically includes an operating system 606, one or more program modules 608, and may include program data 610. The computing device 600 is of a very basic configuration demarcated by a dashed line 614.

The program modules 608 may include instructions for, among other things, implementing classical phase estimation, which may be based on purely random measurements, and for classical post processing of quantum phase estimations. The program modules 608 may include, among other things, algorithms and techniques for iteratively determining bits of a phase and for statistical analysis of measured outcomes including determining phases that maximize conditional probabilities for measured outcomes.

The non-quantum computing device 104 may have additional features or functionality. For example, the computing device 600 may also include additional data storage devices (removable and/or non-removable) such as, for example, magnetic disks, optical disks, or tape. Such additional storage is illustrated in FIG. 6 by removable storage 616 and non-removable storage 618. Computer-readable media may include, at least, two types of computer-readable media, namely computer storage media and communication media. Computer storage media may include volatile and non-volatile, removable, and non-removable media implemented in any method or technology for storage of information, such as computer readable instructions, data structures, program modules, or other data. The system memory 604, the removable storage 616 and the non-removable storage 618 are all examples of computer storage media. Computer storage media includes, but is not limited to, random-access-memory (RAM), read-only-memory (ROM), electrically erasable programmable ROM (EEPROM), flash memory or other memory technology, compact disk (CD), CD-ROM, digital versatile disks (DVD), or other optical storage, magnetic cassettes, magnetic tape, magnetic disk storage or other magnetic storage devices, or any other non-transmission medium that can be used to store the desired information and which can be accessed by the non-quantum computing device 104. Any such computer storage media may be part of the non-quantum computing device 104. Moreover, the computer-readable media may include computer-executable instructions that, when executed by the processor(s) 602, perform various functions and/or operations described herein.

In contrast, communication media embodys computer-readable instructions, data structures, program modules, or other data in a modulated data signal, such as a carrier wave, or other transmission mechanism. As defined herein, computer storage media does not include communication media.

The non-quantum computing device 104 may also have input device(s) 620 such as keyboard, mouse, pen, voice input device, touch input device, etc. Output device(s) 622 such as a display, speakers, printer, etc. may also be included. These devices are well known in the art and are not discussed at length here.

The non-quantum computing device 104 may also contain communication connections 624 that allow the device to communicate, such as over a network, with other computing devices 626 including the quantum computing system 102. These networks may include wired networks as well as wireless networks. The communication connections 624 are one example of communication media.

The illustrated non-quantum computing device 104 is only one example of a suitable device and is not intended to suggest any limitation as to the scope of use or functionality of the various embodiments described. Other well-known computing devices, systems, environments and/or configurations that may be suitable for use with the embodiments include, but are not limited to personal computers, server computers, handheld or laptop devices, multiprocessor systems, microprocessor-base systems, set top boxes, game consoles, programmable consumer electronics, network PCs, minicomputers, mainframe computers, distributed computing environments that include any of the above systems or devices, and/or the like.

B: Quantum Phase Estimation

There are two main approaches to quantum phase estimation: (1) invoking an inverse Quantum Fourier Transform (QFT) to extract information about the phase or (2) performing a basic measurement operation followed by classical post-processing in place of the QFT. An advantage to approach (2) is that it uses classical post-processing in place of quantum operations, trading off an expensive resource for an inexpensive classical computation. In particular, the QFT requires many small controlled-rotations, each of which must be approximated to precision $\epsilon$ by a sequence of basic quantum operations of length $O(\log(1/\epsilon))$. In practice, it may be desirable to significantly reduce the circuit depth of the phase estimation algorithm in exchange for a small increase in circuit width, i.e., the number of qubits. Therefore, this disclosure focuses on approach (2) and utilizes quantum measurements to infer information about the phase.

A phase estimation technique that may be based on random measurements to infer the phase is discussed. This technique uses the fewest number of measurements of any currently known technique (and it is shown that it is within a constant factor of optimal). However, in some instances, the technique may require an impractical amount classical post-processing for use in, say, Shor's algorithm, with a complexity that is exponential in the number of bits being inferred. However, this technique may be practical for other applications. As non-limiting examples, this technique may be practiced in certain classical noisy signal processing and inference applications, where the number of bits being inferred is smaller.

A fast phase estimation technique is discussed. This phase estimation technique considers inference across multiple qubits, and it is shown that this technique requires asymptotically fewer measurements, and in turn has a correspondingly (asymptotically) smaller circuit width and depth, while still allowing efficient classical post-processing.

Four non-limiting models of computation are discussed below: the first is a sequential model with limited parallelism, the second is a parallel model, the third is a model based on a cluster of parallel quantum computers, and the fourth is a model based on a cluster of sequential quantum computers.

Phase Estimation and the Basic Measurement Operation

The goal of quantum phase estimation and the basic measurement operator, following the algorithm of Kitaev (see, A. Y. Kitaev, Electronic Colloquium on Computational Complexity (ECCC) 3 (1996) and A. Y. Kitaev, A. Shen, and M. Vyalyi, Classical and Quantum Computation (American Mathematical Society, Providence, R.I., 2002), are discussed below. The steps are derived slightly differently than Kitaev, in anticipation of extensions discussed in the later sections.

Assume a unitary operator U for which it is desired to estimate the eigenvalues $\lambda_k$ of U given U and the eigenvectors $|\xi_k\rangle$:

$$U|\xi_k\rangle = \lambda_k|\xi_k\rangle, \tag{1}$$

where the eigenvalues take the form $\lambda_k = e^{2\pi i \phi_k}$. The phase $\phi_k$ is a real number modulo 1, which can be represented as a unit-length circle:

$$\varphi_k = \frac{k}{t} \bmod 1, \varphi_k \in \mathbb{R}/\mathbb{Z}, 0 \le k < t < 2^m,$$

where m represents the number of bits of accuracy for which $\phi_k$ is determined (while it may seem more natural at first to instead consider numbers that range between 0 and $2\pi$, rather than choosing a number between 0 and 1 and multiplying by $2\pi$, the latter is chosen because it will be more natural when later considering an expansion of $\phi_k$ as a binary fraction). By measuring the eigenvalues of U, an estimate of the phase $\phi_k$ may be obtained; this process is called quantum phase estimation. (In the context of Shor's algorithm, the corresponding eigenvector is defined as $$|\xi_k\rangle = \frac{1}{\sqrt{t}} \sum_{n=0}^{t-1} e^{-2\pi i \cdot n \varphi_k} |a^n\rangle.)$$

The goal of phase estimation algorithms is to take a state of the form $|\xi_k\rangle$ and determine the corresponding eigenvalue $\lambda_k$. The measurement operation described below commutes with U, so it may be applied multiple times to the same state with different parameters to improve the knowledge of the eigenvalue. There are two parameters in the measurement result: (1) the precision $\delta$ and (2) the probability of error $\epsilon$. That is, some estimate $\alpha$ of $\phi_k$ is obtained where, with probability at least $1-\epsilon$, $|\alpha-\phi_k|_{mod\ 1} < \delta$, where mod 1 is the distance on the unit circle. If $\phi_k$ is chosen from a discrete set of angles $$\frac{k}{t}$$

with fixed t and unknown k, the goal is to make the precision smaller than $$\delta = \frac{1}{2t}$$

so that $\phi_k$ may be determined from this set. As discussed below, the problem may be simplified by directly inferring the angle $\phi_k$ from the discrete set of possible angles, without bothering to introduce a real number precision. In this case $\epsilon$ is the probability of error in the discrete inference.

Basic Measurement Operation

A measurement operator may be constructed such that the conditional probability depends on $\phi_k$, that is, upon measuring this operator, information about $\phi_k$ may be learned. This construction relies on the fact that if $\xi_k$ is an eigenvector of U, then it is also an eigenvector of powers M of U:

$$U^M |\xi_k\rangle = \lambda_k^M |\xi_k\rangle \qquad (2)$$
$$= e^{2\pi i M \cdot \varphi_k} |\xi_k\rangle.$$

The operator takes as input two quantum registers: one initialized to $|0\rangle$ and the other initialized to the eigenvector $|\xi_k\rangle$. The operator depends upon two parameters, a "multiple" M and an "angle" $\theta$, where M is an integer between 1 and t−1 and $\theta$ is a real number between 0 and $2\pi$. In some embodiments, M may be restricted to positive integers.

The measurement operator used to measure the eigenvalues is as follows:

$$\Xi_{M,\theta}(U) = \sum_k \frac{1}{2} \begin{bmatrix} 1+e^{2\pi i M \cdot \varphi_k + i\theta} & 1-e^{2\pi i M \cdot \varphi_k + i\theta} \\ 1-e^{2\pi i M \cdot \varphi_k + i\theta} & 1+e^{2\pi i M \cdot \varphi_k + i\theta} \end{bmatrix} \otimes |\xi_k\rangle\langle\xi_k| \qquad (3)$$
$$= \frac{1}{2} \begin{bmatrix} 1+U^M \exp(i\theta) & 1-U^M \exp(i\theta) \\ 1-U^M \exp(i\theta) & 1+U^M \exp(i\theta) \end{bmatrix},$$

which acts on the quantum states by the following transformation:

$$|0\rangle \otimes |\xi_k\rangle \xmapsto{\Xi_{M,\theta}(U)} \qquad (4)$$
$$\left(\frac{1+e^{2\pi i M \cdot \varphi_k + i\theta}}{2}|0\rangle + \frac{1-e^{2\pi i M \cdot \varphi_k + i\theta}}{2}|1\rangle\right) \otimes |\xi_k\rangle.$$

A phase gate, $R_Z(\theta)$, may be implemented and corresponds to the unitary:

$$R_Z(\theta) = \begin{bmatrix} 1 & 0 \\ 0 & e^{i\theta} \end{bmatrix}. \qquad (5)$$

It follows that the measurement outcome probabilities are given by:

$$P_{M,\theta}(0\mid k) = \left|\frac{1+e^{2\pi i M \cdot \varphi_k + i\theta}}{2}\right|^2 = \frac{1+\cos(2\pi M \cdot \varphi_k + \theta)}{2}, \qquad (6)$$

and $$p_{m,\theta}(1\mid K) = \left|\frac{1-e^{2\pi i M \cdot \varphi_k + i\theta}}{2}\right|^2 = \frac{1-\cos(2\pi M \cdot \varphi_k + \theta)}{2}. \qquad (7)$$

These probabilities are written as conditional probabilities to emphasize that they depend upon the unknown k.

Relation to Classical Fourier Transform and Generalizations

With Eqs. (6,7) in hand, if a large number of measurements are applied using the same M at both $\theta=0$ and $\theta=\pi/2$, cos $(2\pi M \phi_k)$ and sin$(2\pi M \phi_k)$ may be accurately estimated. Using a sufficiently accurate estimate of these cosines and sines at two different values of M allows $\phi_k$ to be accurately determined. This is the problem of reconstructing a sparse signal (in this case, composed of a single Fourier mode) from its value at a small number of different "times" (i.e., different values of M). However, the accurate determination of cos $(2\pi M \cdot \phi_k)$ would require a very large number of measurements, polynomial in t, while other methods require many fewer measurements. The reason is that the large number of measurements at a fixed value of M means that each measurement imparts little additional information. By varying M, accurate results are obtained from a much smaller number of measurements. For example, M may be randomly varied in different measurements, e.g., in a first measurement, M may be 2 and in a second measurement, M may be 8.

This relates to a problem of reconstructing the Fourier transform of a signal from very noisy measurements. The quantum phase estimation problem involves a signal with a single Fourier mode. However, this gives rise to a natural generalization of reconstructing a problem with a small number of Fourier modes from very noisy measurements.

"Information Theory" Phase Estimation

One procedure for estimating the phase (or angle) is to perform a series of random measurements and then solve a hard classical reconstruction problem. The operator is measured at a set of randomly chosen multiples $M_i$ and angles $\theta_i$ and classically reconstruct the angle $2\pi\phi_k$. As shown below, $\phi_k$ can be determined with as few as O(log(t)) measurements and this result is tight.

$M_i$ is randomly selected for each measurement i between 1 and t−1, and a small randomized offset noise $\theta_i = 2\pi r$ is assumed, where r is a random double. The conditional measurement probabilities for this measurement operator on the $i^{th}$ measurement are given by:

$$P_i(0 \mid k) = \frac{1 + \cos(2\pi M_i \cdot \varphi_k + \theta_i)}{2}, \quad (8)$$

and $$P_i(1 \mid k) = \frac{1 - \cos(2\pi M_i \cdot \varphi_k + \theta_i)}{2} = 1 - P_i(0 \mid k). \quad (9)$$

Let $v_i$ be the outcome of the $i^{th}$ measurement. Since different measurements are independent events, the probability of getting a given sequence of measurement outcomes is $$P(v_1, \ldots, v_s \mid k) = \Pi_{i=1}^{s} P_i(v_i \mid k). \quad (10)$$

Assuming a flat a priori distribution of k, the probability distribution of k given the measurement sequence is proportional to $P(v_1, \ldots, v_s \mid k)$. A technique for computing k, given a sequence of s measurements, is as follows: for each k compute the probability $P(v_1, \ldots, v_s \mid k)$, outputting the k which maximizes this. The post-processing time required is of order st, which is exponentially large in the number of bits inferred since the value of k that it outputs can be written with $\lceil \log_2(t) \rceil$ bits.

Bounds on s

In the following discussion it is shown that $O(\log(t))$ measurements suffice to estimate the angle with high probability. This number of measurements required is asymptotically optimal (up to constant factors), as clearly $\lfloor \log_2(t) \rfloor$ measurements are required to have an error probability greater than ½: after s measurements, there are at most $2^s$ possible outcomes for the sequence of measurements, so to select an angle from a set of t choices with probability greater than ½, requires that $2^s > t/2$. A more sophisticated entropic argument would likely be able to improve the constant in front of this lower bound.

The next theorem implies that the number of measurements to obtain error probability at most $\epsilon$ is $-\log_c(t/\epsilon)$ for some constant c<1.

Theorem 1.

Suppose the multiples $M_i$ and angles $\theta_i$ are chosen randomly as discussed above, and suppose the measurement outcomes are chosen with probabilities given in Eqs. (8,9) for $k = k_0$. Then, the probability $\epsilon$ that the algorithm described above chooses a $k' \neq k_0$ as the choice with maximal likelihood is bounded by $$tc^s \quad (11)$$

for some numerical constant c strictly less than 1 (c does not depend upon t).

Proof.

First consider a given $k' \neq k_0$ and estimate the probability that after s measurements, the probability $P(v_1, \ldots, v_s \mid k') = \Pi_{i=1}^{s} P_i(v_i \mid k')$ is greater than or equal to $P(v_1, \ldots v_s \mid k_0)$. Consider the expectation value $$E\left[\frac{P(v_1, \ldots, v_s \mid k')^{1/2}}{P(v_1, \ldots, v_s \mid k_0)^{1/2}}\right], \quad (12)$$

where the expectation value is over measurement outcomes and choices of $M_i$ and $\theta_i$. This equals $$E_{\{M_i, \theta_i\}}\left[\sum_{\{v_i\}} \frac{P(v_1, \ldots, v_s \mid k')^{1/2}}{P(v_1, \ldots, v_s \mid k_0)^{1/2}} P(v_1 \ldots, v_s \mid k_0)\right] =$$
$$E_{\{M_i, \theta_i\}}\left[\sum_{\{v_i\}} P(v_1, \ldots, v_s \mid k')^{1/2} P(v_1, \ldots, v_s \mid k_0)^{1/2}\right],$$

where the sum is over all $2^s$ possible sequences $v_1, \ldots, v_s$ of measurement outcomes and the expectation value is now over all choices of $\theta_i$, $M_i$. This equals $$(E_{M,\theta}[\Sigma_v P_{M,\theta}(v \mid k')^{1/2} P_{M,\theta}(v \mid k_0)^{1/2}])^s. \quad (13)$$

A direct calculation shows that for all $k' \neq k$, the term in parenthesis $E_{M,\theta}[\Sigma_v P_{M,\theta}(v \mid k')^{1/2} P_{M,\theta}(v \mid k_0)^{1/2}]$ is bounded by some constant c<1 for all t. Thus, the expectation value (12) is bounded by $c^s$. Thus, for a given k', the probability that $P(v_1, \ldots, v_s \mid k') \geq P(v_1, \ldots, v_s \mid k_0)$ is bounded by $c^s$, as can be shown by applying Markov's inequality to $$\frac{P(v_1, \ldots, v_s \mid k')^{1/2}}{P(v_1, \ldots, v_s \mid k_0)^{1/2}}.$$

Thus, the probability that there is a k' such that $P(v_1, \ldots, v_s \mid k') \geq P(v_1, \ldots, v_s \mid k_0)$ is bounded by $tc^s$.

The estimate in the above theorem is not optimized: it is possible that a tighter bound could be considered by estimating the expectation value $$E\left[\left(\frac{P(v_1, \ldots, v_s \mid k')}{P(v_1, \ldots, v_s \mid k_0)}\right)^a\right]$$

for some constant 0<a<1 and optimizing the choice of a in the spirit of the Chernoff bound.

Finally, while $\theta$ is selected randomly between 0 and $2\pi$ in the above technique and in the above theorem, in fact it would suffice to pick $\theta$ randomly from the set of angles $\{0, \pi/2\}$, or indeed from any set of a pair of angles that do not differ by exactly $\pi$ (for example, the set $\{0, \pi\}$ would not work). The proof of the theorem would be essentially the same in this case, and restricting to such a smaller set of angles may be more convenient for implementation on a quantum computer.

Classical Inference of Multiple Fourier Modes

The results above suggest a natural generalization of the problem. Define a classical channel E(x) which maps from a real number x between −1 and 1 to an output consisting of a single bit. The output probabilities of this channel are fixed:

$$P(0 \mid x) = \frac{1 + x}{2}, \quad (14)$$

and $$P(1 \mid x) = \frac{1 - x}{2}. \quad (15)$$

Then Eqs. (8,9) can be interpreted as follows: for $\theta_i = 0$, for any $M_i$, the number $\cos(2\pi M_i \cdot \phi_k)$ is taken and this number is input into the channel and the output of the channel is the measurement outcome, while for $\phi_i = 1$, $\sin(2\pi M_i \cdot \phi_k)$ is the input.

This then suggests a natural generalization. Consider a classical signal written as a sum of Fourier modes:

$$f(M) = \Sigma_k a_k \exp(2\pi i M \cdot \phi_k). \quad (16)$$

Here, M is an integer and the function is periodic with period t.

Then, the natural classical problem results:

Problem 1

Assume that f(M) is K-sparse, meaning that at most K of the coefficients $a_k$ are non-zero. Assume that the non-zero $a_k$ are chosen from a discrete set S of possible values (typically the case of |S| being small is most interesting), with $\min_{v \neq w, v \in S, w \in S} |v - w| \geq d_{min}$ for some $d_{min}$. The $a_k$ may be complex.

Let $A_{max}$ be the maximum of |f(M)| over all such K-sparse $a_k$ and over all M.

Assume a channel C(x) (the channel need not be the same as that given above in Eqs. (14,15) which maps from a real number in the range $[-A_{max}, A_{max}]$ to an output chosen from a discrete set. For this channel to be useful in inferring x from measurements of the output, it will be required that different input numbers lead to different output probabilities, and this requirement is quantified more precisely below in Eq. (17).

Pick several different $M_i$, and for each $M_i$ measure $C(Re(f(M_i)))$ or $C(Im(f(M_i)))$. Infer the coefficients $a_k$.

This problem can be interpreted as inferring a classical sparse signal from noisy measurements at several different "times" (interpreting each $M_i$ as a time at which to infer the signal). As discussed below, given suitable assumptions on C(x), this problem can be solved using a number of measurements that is $O(\log(N_{choices}))$ where $N_{choices}$ is the number of possible choices of K-sparse f(M). As before, this number of measurements is asymptotically optimal. Note that for K<<t, $\log(N_{choices}) \approx K \log(t|S|)$.

The procedure described is similar to that previously described: select random $M_i$ and randomly choose whether to measure $C(Re(f(M_i)))$ or $C(Im(f(M_i)))$ at each time. After s measurements, select the choice of $a_k$ which has the maximal a posteriori likelihood, assuming a flat initial distribution. Interestingly, since the number of measurements needed is asymptotically much smaller than $\sqrt{t}$ (indeed as few as log(t) measurements are needed), this random procedure typically does not ever pick $M_i = M_j$ for $i \neq j$. That is, interpreting the $M_i$ temporally, i.e., as "times", this means that the signal is not measured twice at the same time.

Note that that the non-zero coefficients are assumed to be chosen from a small set S of possible values. As the number of possible values of S increases, the number of measurements increases for two reasons. First $N_{choices}$ increases. Second, the values in the set become more closely spaced ($d_{min}$ becomes smaller compared to $A_{max}$), and the measurement outcomes probabilities hence become less sensitive to the particular value of $a_k$. This second problem is actually the more serious one. Suppose that a signal is 1-sparse, and it is known that the only non-zero $a_k$ is at k=0. The question is to infer the magnitude of $a_0$. Every measurement then consists of sending $a_0$ into the channel C(x). Using the channel C(x) before, it takes $1/\epsilon^2$ measurements to infer $a_0$ to precision $\epsilon$. This number of measurements is exponential in the number of bits of precision in $a_0$. That is, it takes many more measurements to infer the amplitude of a Fourier coefficient than it does to infer its frequency.

Theorem 2

Suppose the multiples $M_i$ are chosen at random as above and it is randomly determined whether to measure $C(Re(f(M_i)))$ or $C(Im(f(M_i)))$ at each time. Suppose also that C(x) has the probability that for any x, $y \in [-A_{max}, A_{max}]$ $$\Sigma_v P(v|x)^{1/2} P(v|y)^{1/2} \leq 1 - c_0 |x - y|^2 \quad (17)$$

for some constant $c_0$. Then, the probability $\epsilon$ that the algorithm described above chooses a $k' \neq k_0$ as the choice with maximal likelihood is bounded by $$N_{choices} c^s \quad (18)$$

where $$c \leq 1 - c_0 \left(\frac{d_{min}}{2}\right)^2 \frac{d_{min}^2}{16 A_{max}^2}. \quad (19)$$

Proof.

Assume the correct choice of $a_k$ is given by $\hat{a}_k$. Consider a given sequence $a_k'$ (such that for at least one k, $a_k' \neq \hat{a}_k$) and estimate the probability that after s measurements, the probability $P(v_1, \ldots, v_s|a_k')$ is greater than or equal to $P(v_1, \ldots, v_s|\hat{a}_k)$, where $v_1, \ldots, v_s$ are the measurement outcomes of the channel.

Let $$f_0(M) = \Sigma_k \hat{a}_k \exp(2\pi i M \cdot \phi_k) \quad (20)$$

and $$f'(M) = \Sigma_k a_k' \exp(2\pi i M \cdot \phi). \quad (21)$$

Consider the expectation value $$E\left[\frac{P(v_1, \ldots, v_s | a_k')^{1/2}}{P(v_1, \ldots, v_s | \hat{a}_k)^{1/2}}\right], \quad (22)$$

where the expectation value is over measurement outcomes and choices of $M_i$ and choices of real or imaginary part. This equals $$E_{\{M_i, R_i\}}\left[\sum_{\{v_i\}} \frac{P(v_1, \ldots, v_s | a_k')^{1/2}}{P(v_1, \ldots, v_s | \hat{a}_k)^{1/2}} P(v_1, \ldots, v_s | \hat{a}_k)\right] = $$

$$E_{\{M_i, R_i\}}\left[\sum_{\{v_i\}} P(v_1, \ldots, v_s | a_k')^{1/2} P(v_1, \ldots, v_s | \hat{a}_k)^{1/2}\right],$$

where the sum is over all possible sequences $v_1, \ldots, v_s$ of measurement outcomes and the expectation value is now over all choices of $\theta_i$ and of real or imaginary part ($R_i = 0, 1$ is used to denote a measurement of real or imaginary part). This equals $$\left\{\frac{1}{t}\sum_{M=0}^{t-1}\left(\frac{P(v|Re(f_0(M)))^{1/2} P(v|Re(f'(M)))^{1/2}}{2} + \frac{P(v|Im(f_0(M)))^{1/2} P(v|Im(f'(M)))^{1/2}}{2}\right)\right\}^s, \quad (23)$$

where the probabilities P(v|x) are the probability that the channel C gives output v given input x.

Utilizing the assumptions on C(x) it is shown that the term in parenthesis in Eq. (23) is bounded by some constant c<1 for all t. Thus, the expectation value (22) is bounded by $c^s$. Thus, for given $a_k'$, the probability that $P(v_1, \ldots, v_s|a_k') \geq P(v_1, \ldots, v_s|\hat{a}_k)$ is bounded by $c^s$.

Thus, the probability that there is an $a_k'$ such that $P(v_1, \ldots, v_s|_k') \geq P(v_1, \ldots, v_s|\hat{a}_k)$ is bounded by $N_{choices} c^s$.

Consider $$\frac{1}{t}\sum_M |f'(M) - f_0(M)|^2.$$

This is greater than for $d_{min}^2$. Also, for every M, $|f'(M)-f_0(M)|^2 \leq 4A_{max}^2$. So, for randomly chosen M, the probability that $|f'(M)-f_0(M)|^2$ is greater than or equal to $d_{min}^2/2$ is at least $d_{min}^2/8A_{max}^2$. So, the probability that if M is randomly chosen and it is randomly determined whether to measure real or imaginary part, that the corresponding parts (i.e., either real or imaginary) of $f'(M)-f_0(M)$ is greater than $d_{min}/2$ in absolute value is at least $d_{min}^2/16A_{max}^2$. Hence, by the assumption (17) on $C(x)$, the term in parenthesis in Eq. (23) is bounded by $$c \leq 1 - c_0 \left(\frac{d_{min}}{2}\right)^2 \frac{d_{min}^2}{16A_{max}^2}. \quad (24)$$

A technique for "Information Theory" phase estimation may given by the pseudo code below:

---
"Information Theory" Phase Estimation Pseudo Code 1. for i = 1, ...,s do
2. Choose random $M_i$. Choose random $\theta_i$.
3. Perform basic measurement operation with multiple $M_i$ and angle $\theta_i$
4. End for
5. Maximize
   $P(v_1, ..., v_s|k) = \Pi_{i=1}^s P_i(v_i|k)$
   over all choices of k, where $0 \leq k < t < 2^m$.
6. Return k/t, the estimate of the phase
---

Estimating $\phi_k$ with Constant Precision

Recall that $$\varphi_k = \frac{k}{t} \mod 1,$$

where $\phi_k \in \mathbb{R}/\mathbb{Z}$ and $0 \leq k < t < 2^m$. Let $\theta_i = \{0, \pi/2\}$ at random. Using the measurement operator above and Eqs. (6, 7), the conditional probability when measuring multiple M=1 is given by:

$$P(0|k) = \frac{1 + \cos(2\pi \cdot \varphi_k + \theta_i)}{2} \quad (25)$$

Solving for the conditional probability P(0|k):

$$2P(0|k) - 1 = \cos(2\pi \cdot \varphi_k + \theta_i) \quad (26)$$
$$= \cos(2\pi \cdot \varphi_k)\cos\theta_i - \sin(2\pi \cdot \varphi_k)\sin\theta_i.$$

s measurements, with $\theta_i \in \{0, \pi/2\}$ choosen randomly, are made to obtain approximations $P_{cos}^*$, and $P_{sin}^*$ close to $\cos(2\pi\cdot\phi_k)$ and $\sin(2\pi\cdot\phi_k)$, respectively. Let there be $N_c$ measurements with $\theta_i=0$. Let $N_c(0)$ denote the number of these measurements having outcome 0 and let $N_c(1)$ denote the number having outcome 1. Then, $$P_{cos}^* = \frac{N_c(0) - N_c(1)}{N_c}. \quad (27)$$

If there are $N_s$ measurements with $\theta_i=\pi/2$, with $N_s(0)$ of them having outcome 0 and $N_s(1)$ having outcome 1, then $$P_{sin}^* = \frac{N_s(1) - N_s(0)}{N_s}. \quad (28)$$

Given $P_{cos}^*$, $P_{sin}^*$, an estimate of the angle $\phi_k$ is obtained by taking an arctangent of $P_{sin}^*/P_{cos}^*$, choosing the appropriate quadrant.

Equivalently, multiples $M_i$ of $\phi_k$ can be determined in the same manner by measuring and obtaining the probability $$P(0|k) = \frac{1 + \cos(2\pi M_i \cdot \varphi_k + \theta_i)}{2}, \quad (29)$$

and computing similar estimates P* and again taking an arctangent.

Estimating $\phi_k$ with Exponential Precision

To efficiently achieve exponential precision in the estimate of $\phi_k$, multiples $M_i$ of $\phi_k$ are measured. Then the measurement results in a classical inference technique are used to enhance the precision of the estimate. The technique begins by measuring multiple $M_0=2^{m-1}$, then $M_1=2^{m-2}$, increasing the precision as we move to $M_{m-1}=2^0$.

To achieve the desired precision and probability of error, each multiple is measured s times, where in this section, s refers to the number of measurements per multiple for both cosine and sine, so that the total number of measurements required is 2 ms. The estimate of $2^j \cdot \phi_k$, using methods of constant precision of the estimate of $\phi_k$, is denoted as $\rho_j$.

Introducing binary fraction notation, where $.\alpha_1...\alpha_j = \Sigma_{p=1}^{j} 2^{-p}\alpha_p$, $\alpha_p \in \{0,1\}$. The output of the algorithm is $\alpha = .\alpha_1...a_{m+2}$, which is an exponentially precise estimate of $\phi_k$:

$$|\alpha - \varphi_k| < \frac{1}{2^{m+2}}. \quad (30)$$

Fast Phase Estimation

This section discusses techniques for determining phase estimation by considering inference across multiple bits simultaneously. In particular, an example algorithm, which improves the number of measurements O(m log(m)) as provided by Kitaev's algorithm (see, A. Y. Kitaev, A. Shen, and M. Vyalyi, Classical and Quantum Computation (American Mathematical Society, Providence, R.I., 2002), which is hereinafter referred to as "Kitaev 2002") to O(m log(log(m)).

In some embodiments, the example algorithm comprises two "rounds", the first round is similar to Kitaev 2002 and measures powers of two (albeit a different number of times than Kitaev 2002), and the second round infers multiple bits simultaneously. In some instances, the cardinal number of random powers of two may be a small number, e.g., less than 50.

In some embodiments, the techniques may be further improved by considering more rounds, requiring O(m log(log (log(m)))) measurements for three rounds, and so on. Ultimately techniques that requires O(m log*(m)) measurements, where log*(m) is the iterated logarithm and is bounded for all practical purposes by 5. These techniques all require an amount of computational time for classical post-processing that is as little as O(m log(m)).

Two Round Technique

The measurements used in the first round of the two-round algorithm is similar to those of Kitaev's algorithm, except that the parameter s is chosen differently. Set s=$s_1$ for some $s_1$ chosen later (in the first round this quantity is $s_1$, and in the second round it is $s_2$, and so on). Using a Chernoff bound estimate as in Kitaev 2002, the probability can be bounded such that the difference between $2^{j-1} \cdot \phi_k$ and the best estimate of $2^{j-1} \cdot \phi_k$ is greater than 1/16 by exp(-$cs_1$) for some constant c>0. For notational simplicity, the one piece of notation that was used in Kitaev's original algorithm: for each j, let $\beta_j$ be the closest approximation in the set $$\left\{\frac{0}{8}, \ldots, \frac{7}{8}\right\}$$

to the estimate of $2^{j-1} \cdot \phi_k$. So, the probability of an error larger than 1/8 in $\beta_j$ is bounded by exp(-$cs_1$).

A goal in the first round of the two-round technique is to give, for almost every j, a quantity called $\rho_j$ that will be an estimate of $2^{j-1} \cdot \phi_k$ to a precision $\delta_1$, where the subscript 1 is to indicate that this is the precision on the first round. This quantity $\delta_1$ will be much larger than the final precision $\delta$ of our two-round algorithm, but will be much smaller than 1. As discussed below, this precise estimate $\rho_j$ can be given for 0≤j<m-log(1/$\delta_1$); however, since log($\delta_1$) will be much smaller than m, this will indeed be most of the j.

To compute $\rho_j$, use $\beta_{j+l}$ for l=0, . . . , log(1/$\delta_1$) in a Kitaev-style inference procedure to compute log(1/$\delta_1$)+2 bits in the binary expansion of $\rho_j$. That is, the three lowest order bits in the binary expansion are obtained from $\beta_{j+log(1/\delta_1)}$. The estimate is sharpened by obtaining the $l^{th}$ bit in the binary expansion from $\beta_{j+l-1}$ and from the l+$1^{th}$ and l+$2^{th}$ bits, proceeding iteratively. The probability of error in $\rho_j$ can be bounded by $$Pr[|\rho_j - 2^{j-1} \cdot \phi_k| \geq \delta_1] \leq \log(1/\delta_1)\exp(-cs_1). \quad (31)$$

The factor of log($\delta_1$) occurs because to obtain an error less than $\delta_1$ requires log(1/$\delta_1$) bits of precision. This estimate of the probability of error is essentially the same as the estimate of the probability of having an error in Kitaev's original algorithm, except that instead of having m bits in the expansion, this technique results in log(1/$\delta_1$) bits. These events (having a difference greater than 1/8 for some given j) are not independent. However, the event of having large error for some given j is uncorrelated with the event of having large error for bits j' if |j'-j| is large enough compared to log(1/$\delta_1$). The fact that this technique has only obtained the accurate estimate of $\rho_j$ for j≤m-log(1/$\delta_1$) will not pose a difficulty in what follows. For one thing, most "sets of measurements" (as defined below) do not "contain" (also defined below) the j for which there is not an accurate estimate. Alternately on the first round, all $\rho_j$ for j≤m can be accurately inferred by running the first round on m+log(1/$\delta_1$) bits.

The second round uses $s_2$m "sets" of measurements, for some parameter $s_2$ chosen later, where each set of measurements will consist of repeating the same measurement a total of C times, for some constant C. A parameter S, called the "sparsity" may be introduced in this round. For the $i^{th}$ set of measurements, S different random values of j in the range 1≤j≤m are picked, calling these values $j_1^i, \ldots, j_S^i$. In some instances, it may be required that these values $j_1^i, \ldots, j_S^i$ all be distinct from each other in a given measurement (if any two are equal, another S-tuple of values may be generated; typically, S<<$\sqrt{m}$ so a random tuple will have distinct entries with probability close to 1). Then, $\sigma_i$ is estimated, where $$\sigma_i = (2^{j_1^i - 1} + 2^{j_2^i - 1} + \ldots + 2^{j_S^i - 1})\phi_k. \quad (32)$$

This estimate may be done using C applications of the basic measurement operation, with $$M_i = 2^{j_1^i - 1} + \ldots + 2^{j_S^i - 1}$$

for each measurement and $\theta_i$ being chosen randomly in {0, $\pi$/2}. The constant C may be chosen so that $$Pr[|M \cdot \phi_k - \sigma_i| > 1/32] \leq \frac{1}{8}. \quad (33)$$

The constant C is of order unity and does not depend upon m.

This completes the description of the measurements in the two-round technique. The classical post-processing phase is described below and includes an explanation on how to estimate a quantity $\beta'_j$ for each j. This quantity will be an approximation to $2^{j-1} \phi_k$, chosen from the set $$\left\{\frac{0}{8}, \ldots, \frac{7}{8}\right\}.$$

A goal of the technique is to obtain an estimate such that for all j $$Pr[|2^{j-1} \cdot \phi_k - \beta'_j| > 1/16] \leq \frac{\varepsilon}{m}, \quad (34)$$

for some constant $\varepsilon$. Thus, by a union bound, the probability of an error greater than 1/8 in any of the $\beta'_j$ will be bounded by $\varepsilon$. Then the $\beta'_j$ are utilized to determine the $\alpha_j$. This procedure may be given by the pseudo-code below:

---

Fast Phase Estimation Pseudo Code

1. First Round:
2. for j = m − 1, . . . , 1 do
3.    Estimate $2^{j-1} \cdot \phi_k$ using O(1) measurements per j
4. End for
5. Set sparsity, S, and number of measurements per bit, s.
6. For i = 1 to sm
7.    Set $M_i$ to a sum of S different powers of two, choosing these powers of two at random or with a pseudo-random distribution. Perform O(1) measurements with given $M_i$ and random or pseudo-random $\theta$.
8. End for
9. Perform multi-bit inference to determine estimate of $2^{j-1} \cdot \phi_k$ for all j.
10. Set $.\alpha_m \alpha_{m+1} \alpha_{m+2} = \beta'_m$;
11. for j = m − 1, . . . , 1 do
12. Infer $\alpha_j$:

$$\alpha_j = \begin{cases} 0 & \text{if } |.\overline{0\alpha_{j+1}\alpha_{j+2}} - \beta'_j|_{mod\ 1} < 1/4. \\ 1 & \text{if } |.\overline{1\alpha_{j+1}\alpha_{j+2}} - \beta'_j|_{mod\ 1} < 1/4. \end{cases}$$

13. End for
14. Return $\alpha$, the estimate of the phase.

If the error is bounded by ⅛ for all $\beta'_j$, then the estimate of the phase will be accurate to $2^{-(2n+2)}$.

To estimate $2^{j-1}\cdot\phi_k$, consider all sets of measurements such that one that one of the random values of $j_a$ was equal to j; such a set of measurements is defined as "contains j". On average, there will be $s_2 S$ such sets of measurements. In the following discussion, it is assumed that there are indeed exactly $s_2 S$ sets of measurements. The more general case where there are fluctuations in the number of sets of measurements is dealt with later.

On the $i^{th}$ set of measurements, some estimate of $\sigma_i$ is obtained. Suppose this set contains j. Without loss of generality, suppose that $j_1 = j$. Then, given $\sigma_j$ and $\rho_{j_2}, \ldots, \rho_{j_S}$, the best estimate of $2^{j-1}\cdot\phi_k$ is:

$$\sigma_i - \rho_{j_2} - \rho\rho_{j_3} - \ldots - \rho_{j_S} \quad (35)$$

Next, the probability that the estimate is off by more than 1/16 is bounded. This may be done by bounding the probability that our value of $a_j$ differs by more than 1/32 from the correct value using Eq. (33) and also bounding the probability that our estimate of $\Sigma_{l=2}^{S}\rho_{j_l}$ differs by more than 1/32 from the correct value. To bound that probability, the following equation may be utilized:

$$Pr[|(\Sigma_{l=2}^{S}\rho_{j_l} - 2^{j_l-1}\cdot\phi)| \geq 1/32] \leq S\log(32S)\exp(-cs_1), \quad (36)$$

where $\delta_1 = 1/32S$ in Eq. (31) so that if each quantity $\rho_{j_2} - 2^{j_l-1}\cdot\phi$ is accurate to within $\delta_1$ then the sum is accurate to within 1/32. Then a union bound is utilized: if the probability that any given measurement is inaccurate is bounded by $\log(1/\delta_1)\exp(-cs_1)$, then the probability that at least one measurement is inaccurate is bounded by S times that quantity.

$s_1 \sim \log(\log(m))$ and $S \sim \log(m)$ may be chosen so that the right-hand side of Eq. (36) is bounded by 1/32. Then, using Eqs. (33,36), the probability that the quantity in Eq. (35) differs by at least 1/16 from $2^{j-1}\cdot\phi_k$ is bounded by ¼. Approximately, $s_2 S$ different estimates of $2^{j-1}\cdot\phi_k$, one for each set of measurements involving the given j, may be determined. Assuming that certain events, namely that the quantity in Eq. (35) differs by more than 1/32 from $2^{j-1}\cdot\phi_k$ are independent (this is discussed further below). Then, these measurements may be combined to obtain an estimate of $\beta'_j$ by picking the value of $\beta'_j$ which is most frequently within 1/16 of $\Sigma_{l=2}^{S}(\rho_{j_l} - 2^{j_l-1}\cdot\phi)$; i.e., it is within 1/16 of that value for the greatest number of sets of measurements containing j.

The probability of error in $\beta'_j$ by more than 1/16 is then bounded by $\exp(-c's_2 S)$ for some constant $c'>0$. Picking $s_2 \sim 1$, it is found that the probability of error is 1/poly(N) for any desired polynomial, with the power depending upon the ratio between $S/\log(m)$, which ensures that this probability is small compared to $\epsilon/m$. The number of measurements required by this procedure is $O(m\log(\log(m)))$.

Several issues of correlations and fluctuations that were left open in the above analysis are now discussed. First, consider the fluctuation in the number of sets of measurements that contain j, for any given j. On average this quantity is $s_2 S$, but there may be some fluctuations. However, the probability that there are fewer than $s_2 S/2$ different such sets of measurements is exponentially small in $s_2 S$, and hence for the given choice of $s_2 S$, the quantity is bounded by 1/poly(N) and so can be made negligible (in fact, this probability, being exponentially small in $s_2 S$, has a similar scaling as the probability that incorrectly infers a given $2^{j-1}\cdot\phi_k$ given $s_2 S$ sets of that contain j, as that probability is also exponentially small in $s_2 S$). So, with high probability all j are contained in at least $s_2 S/2$ measurements, and so S may be doubled and the analysis above may be applied.

Another way to deal with fluctuations in the number of measurements is to change the distribution of choices of $j_a^i$, and anti-correlate the choices in different sets of measurements to reduce the fluctuations in the number of sets of measurements containing a given j. In some instances, this will at best lead to a constant factor improvement.

Another kind of correlation that should be dealt with is correlation between the events that the quantity in Eq. (35) differs by more than 1/16 from $2^{j-1}\cdot\phi_k$. For a given j, assume for a given set of measurements $j_1^i = j$, and refer to $j_2^i, \ldots, j_S^i$ as the "partners" of j. For a given j, the different sets of measurements involving that j will typically have wildly different partners of j; that is, for two different sets of measurements, m, n, the following inequality will typically occur: $|j_a^m - j_b^n| \gtrsim N/S^2 >> \log(S)$ for a, $b \neq 1$. So, for most sets of measurements, these will be independent. Similarly, in a given measurement the following inequality, $|j_a^m - j_b^m| >> \log(S)$, will typically be true, so correlations between errors in different $\rho_{j_a}$ may be ignored.

Note that if for a given j there is a large number of (roughly) independent sets of measurements containing that j, then adding a small number of correlated sets of measurements will not prevent the inference from working.

Multiple Round Technique

In some embodiments, the above procedure may be modified by increasing the number of rounds. In modified procedure, the first and second rounds proceed as before, though the constants $s_1, s_2, S$ may be changed. For the second round, write $S = S_2$. The third round of the modified procedure is the same as the second round, except that $s_3$ sets of measurements are done, and in each measurement $S_3$ different random values of j are picked. On the third round, as in the second, each set of measurements is repeated C times. It is only the first round where the quantity C does not appear, for the reason that in that round, each measurement is already being repeated $s_1$ times. The number of rounds may be increased indefinitely. In each round, the sparsity may be exponentially increased as compared to the previous round, while keeping all constants $s_a$ of order unity. The number of measurements is then proportional to the number of rounds. Since S increases exponentially in each round and $S \sim \log(m)$ is needed in the last round, the number of rounds required is $\sim \log^*(m)$ and the total number of measurements is $\sim m \log^*(m)$.

Classical Post-Processing Time Required

The simplest implementation of the technique above requires a time $O(m\log^2(m))$. A discussion of this provided first and then a discussion on how to improve to $O(m\log(m))$ is provided. Each bit is contained in $\sim \log(m)$ sets of measurements. To compute the quantity in Eq. (35), the sum on the right-hand side require summing over S different quantities, and for $S \sim \log(m)$, this means that it takes time $\sim \log(m)$ to do the computation for each bit for each set of measurements containing that bit. So, with m bits, each contained in $\log(m)$ sets of measurements, the time is $O(m\log^2(m))$.

However, this may be slightly improved by noting that Eq. (35) can be written as $$\sigma_i - (\rho_{j_1} + \rho_{j_2} + \ldots + \rho_{j_S}) + \rho_{j_1}. \quad (37)$$

The quantity in parentheses can be computed once for each set of measurements, and re-used in inferring each of the $\rho_{j_i}$ for $i \in \{1, \ldots, S\}$, and then the computation requires at little as $O(1)$ time to do the arithmetic for each of these i. This improves the total time to $O(m\log(m))$.

Another technique for Fast Phase Estimation may be given by the pseudo-code below:

---

Fast Phase Estimation Pseudo Code

1. First Round:
2. for j = m − 1, . . . , 1 do
3. Estimate $2^{j-1} \cdot \phi_k$ using O(1) measurements per j
4. End for
5. Later Rounds:
6. For r = 2 to Number of Rounds do
7. Set sparity, S, and number of measurements per bit, $s_r$, for given round.
8. For i = 1 to $s_r m$
9. Set $M_i$ to a sum of S different powers of two, choosing these powers of two at random or with a pseudo-random distribution. Perform O(1) measurements with given $M_i$ and random or pseudo-random θ.
10. End for
11. End for
12. Perform multi-bit inference to determine estimate of $2^{j-1} \cdot \phi_k$ for all j. Use estimates from previous round to give starting point for inference in next round.
13. Set $\overline{.\alpha_m \alpha_{m+1} \alpha_{m+2}} = \beta'_m$;
15. for j = m − 1, . . . , 1 do
16. Infer $\alpha_j$:

$$\alpha_j = \begin{cases} 0 & \text{if } |\overline{.0\alpha_{j+1}\alpha_{j+2}} - \beta'_j|_{mod\ 1} < 1/4. \\ 1 & \text{if } |\overline{.1\alpha_{j+1}\alpha_{j+2}} - \beta'_j|_{mod\ 1} < 1/4. \end{cases}$$

17. End for
18. Return α, the estimate of the phase.

---

Analysis of Circuit Depth and Width

The fast phase estimation technique offers an asymptotic improvement in the number of measurements required to estimate the phase with exponential precision. The following discusses how the corresponding quantum circuit scale, in terms of depth, width and size. The depth of a quantum circuit is defined as the number of timesteps, where gates on disjoint qubits can occur in parallel in a given timestep. Here it is assumed that a given n-qubit gate takes one timestep. The width of a quantum circuit is defined as the number of qubits. The size of a quantum circuit is the total number of non-identity quantum gates. To emphasize tradeoffs in depth and width depending on resource availability, the circuits for three different computing settings are analyzed. A summary of the circuit resources required for each technique given the setting is provided below in Table 1.

TABLE 1 of circuit depth, width, and size for fast phase estimation.

| | Fast Phase Estimation | | |
|---|---|---|---|
| Type | Depth | Width | Size |
| Sequential | O(mlog*(m)) | O(mlog*(m)) | O(mlog*(m)) |
| Parallel | O(log(m)) | O(mlog*(m)) | O(mlog*(m)) |
| Cluster | O(log*(m)) | O(m²) | O(mlog*(m)) |

First, consider the setting where each measurement operator is performed sequentially. That is, the circuit is given by the sequence of gates (shown in FIG. 2)

$$H^{\otimes ms} R_z(\theta_1) \Lambda^1(U^{M_1})[q_1, A] \ldots R_z(\theta_{M_{ms}})$$
$$\Lambda^1(U^{M_{ms}})[q_{ms}, A] H^{\otimes ms},$$

where $\Lambda n(U)[q_1, q_2]$ denotes n-qubits in register $q_1$ controlling the application of gate U to register $q_2$. The quantum register containing the eigenvector state is denoted by |A⟩ and is comprised of a qubits. Each phase estimation algorithm performs O(ms) measurements, resulting in a circuit of depth and size O(ms). The circuit requires O(ms) ancilla qubits, one per measurement, plus a additional qubits. For Kitaev 2002 phase estimation and fast phase estimation, s equals O(log(m)) and O(log*(m)), respectively. Thus in the sequential setting, fast phase estimation offers an asymptotic improvement in circuit depth and size, as well as in the number of ancilla qubits.

Second, consider a more parallel setting obtained by decreasing circuit depth at the cost of increasing circuit width. The quantum phase estimation may be parallelized. The idea is to apply one multi-controlled $U^M$ gate, where M is given by $$M = \Sigma_{j=1}^{ms} M_j q_j. \quad (38)$$

In some embodiments, the quantum phase estimator 118 performs $$|M\rangle \otimes |A\rangle \rightarrow |M\rangle \otimes U^M |A\rangle. \quad (39)$$

Using a quantum addition circuit based on a 3-2 quantum adder (also called a carry-save adder), three m-bit numbers can be encoded as two numbers in O(1) depth, with width O(m) and size O(m). Represent the value M as a sum of s m-bit integers. The circuit first uses a log(s)-depth tree of 3-2 adders to produce two encoded numbers, and then adds these two numbers in place using a quantum carry-lookahead adder with O(m) ancillas, O(m) size, and O(log(m)) depth. In total, a quantum circuit can be constructed to add s m-bit integers in depth O(log(m)+log(s)) and O(ms) size and O(ms) ancillae.

An example circuit for performing parallel phase estimation is shown in FIG. 3. The circuit begins with a quantum register containing qubits initialized to |0⟩. Each qubit $q_i$ undergoes a Hadamard operation, followed by a phase rotation by angle $\theta_i$ about the z-axis. An addition circuit (e.g., adder gate 318) is applied to determine |M⟩. A controlled $U^M$ operation is applied, followed by an addition circuit to uncompute |M⟩. Finally, O(ms) Hadamard operations, and then O(ms) measurements, are performed, which can be done in depth O(1). The complete circuit for parallel phase estimation requires O(ms) size and O(log(m)+log(s)) depth, up to the implementation of the controlled $U^M$ gate. Again, s equals O(log(m)) for Kitaev's phase estimation and O(log*(m)) for fast phase estimation yielding a significant reduction in circuit size to O(m log*(m)).

Third, consider access to a cluster of quantum computers containing m nodes. (See, FIGS. 4 and 5.) Each node 402, 502 performs s measurements, resulting in a depth of O(s), with a size and width per node of O(s) gates and O(s+a) qubits, respectively. Considering the overall cost across all m nodes, then the result is O(s) depth, O(ms) gates, and O(ms+ma) qubits. Again, fast phase estimation yields asymptotic improvements in all dimensions, and results, for all practical purposes, in a constant-depth phase estimation circuit. One potential advantage of the cluster model is that errors do not accumulate on the eigenvector state |A⟩, since subsets of measurements are done on separate nodes. This could be advantageous when designing a fault-tolerant phase estimation algorithm.

CONCLUSION

The above-described techniques pertain to phase estimation. Although the techniques have been described in language specific to structural features and/or methodological acts, it is to be understood that the appended claims are not necessarily limited to the specific features or acts described. Rather, the specific features and acts are disclosed as exemplary forms of implementing such techniques.

What is claimed is:

1. A method of performing a quantum calculation, comprising:
    applying a first random phase factor ($e^{2\pi i\theta}$) to an ancillary qubit;
    applying a second random phase factor ($e^{2\pi iM\Phi}$) to a calculational state comprised of multiple qubits, wherein applying the second random phase factor ($e^{2\pi iM\Phi}$) to the calculational state comprised of multiple qubits includes:
    providing a controlled unitary gate that is controlled by the ancillary qubit, wherein the controlled unitary gate includes an applied unitary operator (Y) that is equivalent to multiple (M) applications of a base unitary operator (U), $Y=U^M$, wherein M is a positive integer;
    measuring a state of the ancillary qubit to obtain phase information related to the second random phase factor; and
    calculating a phase ($\alpha$) of a phase factor ($e^{2\pi i\alpha}$) for the calculational state based at least in part on the measured state of the ancillary qubit.

2. The method of claim 1, further comprising:
    randomly selecting a phase ($\theta$) for the first random phase factor ($e^{2\pi i\theta}$) from a set of phases containing a first phase and a second phase that is approximately ninety degrees offset from the first phase.

3. The method of claim 1, further comprising:
    selecting a multiple (M) of the second random phase factor)($e^{2\pi iM\Phi}$) to be a sum of multiple random powers of two.

4. The method of claim 1, wherein M, the multiple applications of the base unitary operator (U), has a value that is a sum of multiple random powers of two.

5. The method of claim 1, wherein calculating the phase ($\alpha$) of the phase factor ($e^{2\pi i\alpha}$) for the calculational state based at least in part on the measured state of the ancillary qubit includes:
    determining a value for the phase ($\alpha$) that maximizes a conditional probability distribution function; and
    setting the phase ($\alpha$) to the determined value.

6. The method of claim 1, wherein the ancillary qubit is one of a plurality of ancillary qubits, and wherein applying the first random phase factor ($e^{2\pi i\theta}$) to an ancillary qubit includes:
    applying the first random phase factor ($e^{2\pi i\theta}$) to the plurality of ancillary qubits.

7. The method of claim 6, further comprising:
    adding, by a quantum adder gate, the plurality of ancillary qubits having the first random phase factor ($e^{2\pi i\theta}$) applied thereto to produce a summed state; and
    applying the summed state, as a control, to a controlled unitary gate, wherein the controlled unitary gate applies the second random phase factor) ($e^{2\pi i\theta}$) to the calculational state responsive to the control of the summed state.

8. The method of claim 6, wherein the ancillary qubit is one of a plurality of ancillary qubits, and wherein measuring for each ancillary qubit of the plurality of ancillary qubits a corresponding state to obtain phase information related to the second random phase factor.

9. The method of claim 8, wherein the states of the plurality of ancillary qubits are measured approximately concurrently.

10. The method of claim 8, wherein the states of the plurality of ancillary qubits are measured by a single measurement device.

11. A method of performing a quantum calculation, comprising:
    applying a plurality of first random phase factors to a plurality of ancillary qubits;
    applying a plurality of second random phase factors to a calculational state comprised of multiple qubits, wherein each of the second random phase factors includes a multiple that is a sum of multiple random powers of two;
    for each ancillary qubit of the plurality of ancillary qubits, measuring a respective state to obtain phase information related to a corresponding one of the plurality of second random phase factors; and
    calculating a phase ($\alpha$) of a phase factor ($e^{2\pi i\alpha}$) for the calculational state based at least in part on the measured states of the plurality of ancillary qubits.

12. The method of claim 11, wherein calculating the phase ($\alpha$) of the phase factor ($e^{2\pi i\alpha}$) for the calculational state based at least in part on the measured states of the plurality of ancillary qubits includes:
    iteratively calculating bits of the phase ($\alpha$), when the phase ($\alpha$) is expressed as a binary fraction.

13. The method of claim 11, wherein prior to each of applying a plurality of first random phase factors, applying a plurality of second random phase factors to a calculational state, and measuring a respective state to obtain phase information related to a corresponding one of the plurality of second random phase factors, the method further comprises:
    applying a plurality of first non-random phase factors to a previous plurality of ancillary qubits;
    applying a plurality of second non-random phase factors to a calculational state comprised of multiple qubits, wherein each of the second non-random phase factors includes a multiple that is a power of two; and
    for each ancillary qubit of the plurality of previous ancillary qubits, measuring a respective state to obtain phase information related to a corresponding one of the plurality of second non-random phase factors.

14. The method of claim 11, wherein the plurality of first random phase factors is a first plurality of first random phase factors, wherein the plurality of second random phase factors is a first plurality of second random phase factors, and wherein the plurality of ancillary qubits is a first plurality of ancillary qubits, the method further comprising:
    applying the second plurality of first random phase factors to a second plurality of ancillary qubits;
    applying a second plurality of second random phase factors to the calculational state, wherein each of the second random phase factors of the second plurality of the second random phase factors includes a multiple that is a power of two; and
    for each ancillary qubit of the second plurality of ancillary qubits, measuring a respective state to obtain phase information related to a corresponding one of the second plurality of second random phase factors.

15. The method of claim 14, wherein the first plurality of second random phase factors is different from the second plurality of second random phase factors.

16. A quantum computing device, comprising:
    a quantum phase estimator circuit having:
    a phase gate configured to apply a first random phase factor to an ancillary qubit;
    a controlled unitary gate configured to be controlled by the ancillary qubit having the first random phase factor applied thereto and configured to controllably apply a second random phase factor to a calculational state comprised of multiple qubits; and a measurement device configured to measure, after the ancillary qubit controls the controlled unitary gate, state information of the ancillary qubit, wherein a phase of the calculational state is determined based at least in part on the measured state information.

17. The quantum computing device of claim 16, wherein the controlled unitary gate includes an applied unitary operator (Y) that is equivalent to multiple (M) applications of a base unitary operator (U), $Y=U^M$, wherein the calculational state is an eigenvector of the base unitary operator (U), and wherein M, the multiple applications of the base unitary operator (U), has a value that is a sum of multiple random powers of two.

18. The quantum computing device of claim 16, wherein a phase (A) of the first random phase factor is selected from a set of phases containing a first phase and a second phase that is approximately ninety degrees offset from the first phase.

* * * * *